Feb. 3, 1970      J. MOZDZANOWSKI      3,493,221

ELASTOMERIC ANNULAR SPRING ASSEMBLY

Filed June 20, 1967

Feb. 3, 1970  J. MOZDZANOWSKI  3,493,221
ELASTOMERIC ANNULAR SPRING ASSEMBLY
Filed June 20, 1967  2 Sheets-Sheet 2

Inventor:

United States Patent Office 3,493,221
Patented Feb. 3, 1970

3,493,221
ELASTOMERIC ANNULAR SPRING ASSEMBLY
Joachim Mozdzanowski, Boppard, Germany, assignor to Gesellschaft Technischen Fortschritt m.b.H., Hohr-Grenzhausen, Germany
Filed June 20, 1967, Ser. No. 647,530
Int. Cl. F16f 1/39, 1/40
U.S. Cl. 267—1                                 12 Claims

ABSTRACT OF THE DISCLOSURE

A compression spring assembly which comprises an annular member of elastomeric material having an inner surface which includes a portion defining a minimum diameter of the member in the unstressed condition of the latter, and an outer surface which includes the portion defining a maximum diameter of the member. A pair of compression members engage opposite axial ends of the annular member along respective annular areas whose diameter is greater than the minimum diameter of the annular member in the unstressed condition thereof, but smaller than the minimum diameter plus half the distance between the aforementioned portions. At least one of the compression members is movable toward the other so that, in response to axial compression of the annular member resulting from such movement, the maximum diameter of the annular areas of engagement increases.

BACKGROUND OF THE INVENTION

The present invention relates to springs in general, and more particularly to spring assemblies. Still more particularly, the present invention relates to a compression spring assembly utilizing an annular compression spring of elastomeric material.

The use of elastomeric compression springs is not unknown. Conventionally, such springs are massive members of elastomeric material which are engaged between two compression members of which at least one is movable toward and away from the other. The extent to which such members can be compressed, as related to the maximum extension of the member in the direction in which the compressive force acts thereon, differs with conditions of use. Maximum compressibility is governed by the frequency of compression and, in cases where compression takes place intermittently, this maximum compressibility reaches a value of substantially 25% as related to the aforementioned extension of the elastomeric member in the direction in which the compression forces act, whereas in case of continuous compression stresses, this value decreases and ranges between 10 and 15%.

Spring assemblies using elastomeric compression springs find their primary application in road vehicles and in rail vehicles. The problem which has been encountered in the use of such compression springs in vehicles of this type is the fact that new construction techniques result in the construction of vehicles which are ever lighter, so that the differential between the empty weight of the vehicle and the loaded weight of the vehicle becomes constantly greater, which results in an increase of the extent to which compressibility of the spring is required. Also, the uses of such springs require that the compression characteristic be progressive so as to make the characteristic frequency of the spring as independent as possible from the load condition of the vehicle. For this reason the potential inherent in the use of massive compression springs of elastomeric material in the applications mentioned before has not been realized because the just-recited requirements have heretofore been incapable of satisfaction except with an air spring, that is with a hollow air-filled spring of elastomeric material.

On the other hand, such hollow air-filled springs of elastomeric material are not very satisfactory because they must be relatively large, and they require a relatively complicated construction making use of sensitive elements, such as regulating valves and the like, which are not only difficult to manufacture but are also difficult and expensive to maintain.

The present invention provides a novel compression-spring assembly.

More particularly, the present invention provides a compression spring assembly utilizing a massive compression spring of elastomeric material which is not subject to the disadvantages outline before.

The invention also provides a compression spring assembly which is extremely simple in its construction and which is therefore very inexpensive to manufacture and to sell.

The compression spring assembly according to the present invention requires little or no maintenance and is not possessed of complicated or sensitive constituent components.

Briefly stated, one feature of my invention resides in the provision of a compression spring assembly which includes an annular member of elastomeric material having an inner surface and an outer surface. The inner surface of this annular member includes a portion which defines a minimum diameter of the member in unstressed condition thereof, and the outer surface similarly comprises a portion which, however, defines a maximum diameter of the annular member.

A pair of compression members are disposed at the opposite axial ends of the annular member and at least one of these compression members is movable toward the other. Both compression members have engagement faces which face the annular member and which extends transversely of the axis of the latter outwardly beyond the outer surface. In accordance with the invention the faces of these compression members engage the annular member along respective annular areas whose diameter is greater than the aforementioned minimum diameter of the annular member while the same is in the unstressed condition. At the same time, however, the diameter of these annular areas is also smaller than the minimum diameter plus half the distance between the aforementioned portions of the inner and outer surfaces and as a result the maximum diameter of the annular areas increases when the annular member is subjected to axial compression resulting from movement of one of the compression members toward the other, or of both compression members towards one another.

The invention makes it possible for the annular member of elastomeric material to undergo a very significant deformation in radial outward direction in response to axially acting compression stresses, and this in turn assures that a large volume of the elastomeric material of the annular member is affected by such deformation, resulting in a compressibility and a stress distribution throughout the material of the annular member which have not been known in this art until now.

In accordance with the invention the compression members are discreet member, that is they are not coupled to the annular member in any way, such as by being vulcanized thereto, because this would inhibit the desired travel in radially outward direction and reduce or destroy the effectiveness which I have obtained.

It is also a feature of my invention to have the outer surface of the annular member be convexly curved in such a manner that the maximum radial thickness of the annular member, as seen in a plane normal to the axis thereof, is substantially midway between the axial ends of this member.

Advantageously, the maximum radial thickness of the annular member is smaller than its axial length and the radius of curvature of the outer surface of the annular member is smaller than the radius of curvature of the inner surface of the annular member. It will be understood that the radius of curvature of the inner surface of the annular member can be infinite.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTIONS OF THE DRAWING

DESCRIPTION OF THE PREFERRED EMBODIMENTS

Figure 1:
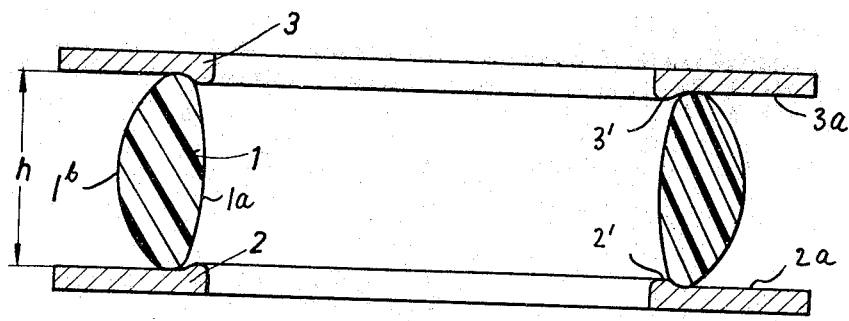
FIG. 1 illustrates, in a partially sectioned and somewhat schematic view, one embodiment of the invention in unstressed condition.
Figure 2:
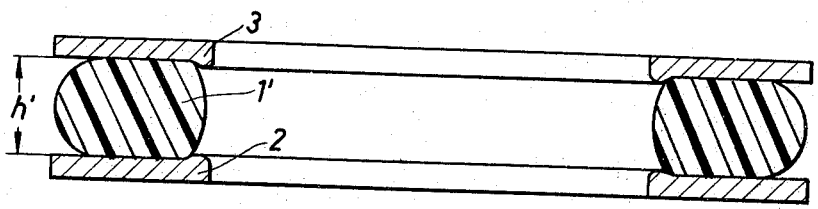
FIG. 2 is a view similar to that shown in FIG. 1, but illustrating the same embodiment in stressed condition.

Discussing now the drawing in detail, and firstly FIGS. 1 and 2 thereof, it will be seen that the annular member of elastomeric material is generally indicated with reference numeral 1. This member has an inner surface 1a which in the illustrated embodiment is convexly curved, and an outer surface 1b which is also convexly curved, it being obvious that the radius of curvature of the surface 1b is smaller than the radius of curvature of the surface 1a, as viewed in axial section of the member 1. The distance of the member 1, that is its height, intermediate the axial ends thereof is indicated with reference designation $h$, and the axial ends of the member 1 are engaged by two compression members 2 and 3. These compression members have respective radially extending surfaces 2a and 3a which extend radially outwardly beyond the outer surface 1b of the member 1. It is these surfaces 2a and 3a which engage the opposite axial ends of the member 1 and it will be seen from the drawing that they engage these ends along annular areas whose diameter is greater than the minimum diameter of the annular member 1 as measured intermediate diametrically opposite points of the inner surface 1a, while it is smaller than this minimum diameter plus half the maximum thickness of the member 1 intermediate the inner surface 1a and the other surface 1b.

FIG. 2 illustrates that, as one of the compression members is moved toward the other, or as both compression members 2, 3 are moved toward one another, the diameter of these annular areas of engagement increases radially outwardly, but does not decrease radially inwardly, or at least not to any significant extent. From this it is clear that as the height $h$ of the member 1 increases in response to the axial compression until it reaches the dimension $h'$ shown in FIG. 2, the area of contact between the member 1 and the compression members 2 and 3 increases simultaneously, namely in radially outward direction, whereby an increasing amount of material of the member 1 is involved in the deformation which takes place during such axial compression. It is clear from a comparison of FIGS. 1 and 2 that with the novel compression spring assembly illustrated therein the extent of compression of the member 1 is on the order of 50%, that is substantially twice that which is now possible with conventional spring assemblies using solid elastomeric compression springs and operating under the best possible conditions.

The compression members 2 and 3 in the embodiment illustrated in FIGS. 1 and 2 are of annular configuration and are bounded at their inner edges by shoulders 2', 3' which serve to center the member 1, and to simultaneously assist in preventing inwardly directed deformation of the material of the member 1.

It is evident from the drawing that the volume of the material of member 1 remains unchanged and that only the cross-sectional configuration of the member 1 varies by the radially outward movement of the material whereby, however, the development of excessive stresses on any portion of the surfaces of the member 1, or indeed on any portion of the member 1 throughout the cross-sectional area thereof, is avoided thus making possible the increased compressibility and a correspondingly increased frequency of compressions which the member 1 can withstand.

Figure 3:
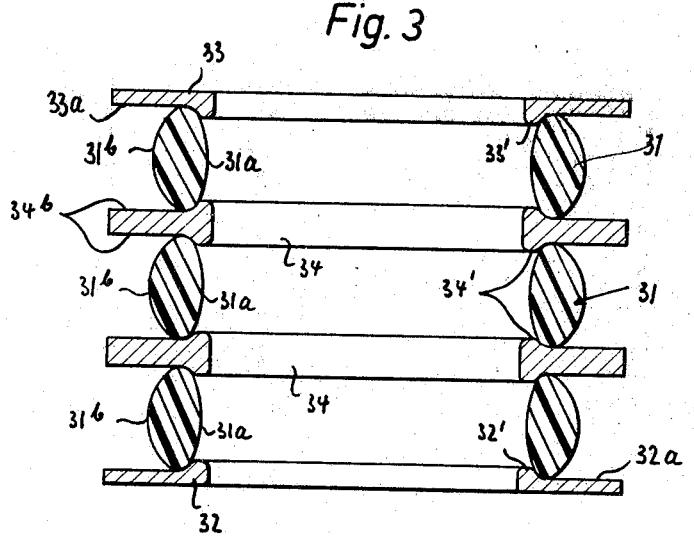
FIG. 3 is a view similar to FIG. 1, but illustrating a different embodiment of the invention.

Discussing now FIG. 3 it will be seen that this is essentially a composite spring assembly constituted by three assemblies of the type shown in FIG. 1. The reference numerals supplied in FIG. 3 are identical with those of FIG. 1 except for being provided with the prefix "3" in each case. Thus it will be seen that there are provided three identical annular members 31 which are arranged coaxially with one another. The free end faces of the outermost annular members 31 are engaged by the two compression members 32, 33 which correspond to the compression members 2 and 3 shown in FIG. 1. Engagement takes place via the faces 32a, 33a of the compression members 32 and 33.

However, because the embodiment illustrated in FIG. 3 is a composite assembly it is necessary that stress be transmitted from one to the other of the members 31. Therefore, it will be seen that there are disposed between the center member 31 and the two outermost members 31, two stress-transmitting members 34 which are of identical configuration and which, it will be noted, are also essentially the same as the members 32 and 33 except for the fact that they are provided on both axial sides with engagement faces 34a corresponding to the engagement faces 32a, 33a of the members 32 and 33. Thus, each of the members 34 engages with its oppositely directed engagement faces 34a to axially adjacent ones of the annular members 31, as is clearly evidenced from FIG. 3. Another difference between the members 34 on the one hand and the members 32 and 33 on the other hand is the fact that the members 34 are provided on both axial sides with the annular shoulders 34' so that each of the members 34 centers and retains two axially adjacent annular members 31 with its two shoulders 34'. The operation of the embodiment shown in FIG. 3 is the same as that in FIGS. 1 and 2, and an operation thereon is believed not to be necessary, it being evident that the embodiment in FIG. 3 is intended for applications where large axial deflections are to be withstood which are more severe than those which are applied to the embodiment of FIGS. 1 and 2.

Figure 4:
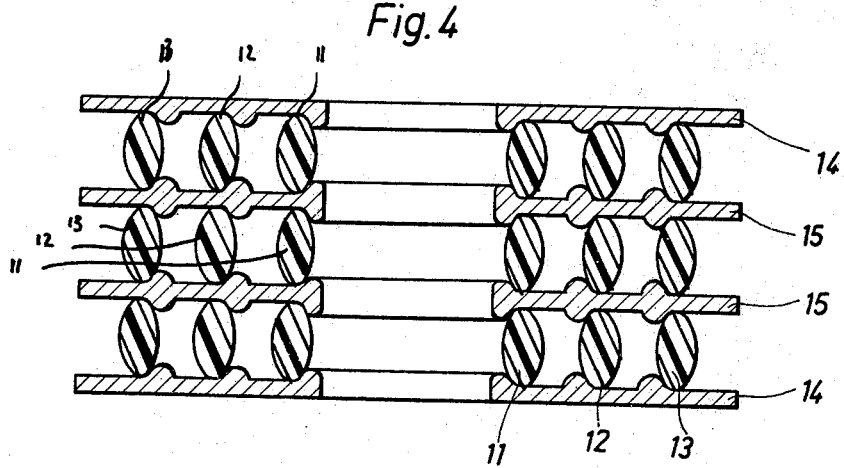
FIG. 4 is a view which is also similar to that of FIG. 1, but again illustrating a further embodiment of the invention.

Coming, finally, to the embodiment shown in FIG. 4, it will be seen that this is somewhat reminescent of that shown in FIG. 3, utilizing, however, not three individual members 31 but rather three sets of such members each comprised of three concentric members. In FIG. 4 the annular members of each set are identified with reference numerals 11, 12 and 13 and it will be seen that they are concentric with one another, located in a common plane and being radially spaced from one another. The members of the two end or terminal sets are engaged by compression members 14 corresponding to the members 32 and 33 shown in FIG. 3, whereas stress-transmitting members 15, corresponding to the members 34 shown in FIG. 3, are disposed between the annular members of the center set and the annular members of the two terminal sets. The compression members and stress-transmitting members 14 and 15 are each provided with shoulders corresponding to the shoulders 32', 33' and 34' shown in FIG. 3 and the operation of the embodiment shown in FIG. 4 differs in no way from the embodiments of FIGS. 1 and 3 except that the embodiment of FIG. 4 is intended for heavier-duty and larger deflection applications than that in FIG. 1.

I have conducted tests with my spring assembly disclosed herein and I have found, for instance utilizing an annular member of elastomeric material having a height $h$ of substantially 75 mm., and a minimum or inner diameter of substantially 150 mm. and a maximum or outer diameter in unstressed condition of 220 mm., that this member withstood substantially 1 million compression cycles at a frequency of 10 Hz. and at a strain ranging between 30 and 50% of the height $h$, without showing any damage. The tests were carried out on a dynamic tester.

It will be understood that various different materials are suitable for the member 1, as long as they have elastomeric properties. Thus, natural or synthetic rubber, or other synthetic plastic materials can be used for this purpose. The compression members 2 and 3 may be made of metal or any other suitable material capable of withstanding the stresses exerted thereon.

It will be understood that each of the elements described above, or two or more together, may also find a useful application in other types of spring assemblies differing from the types described above.

While the invention has been illustrated and described as embodied in a compression spring assembly, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of ths invention and, therefore, such adaptations should and are intended to be comprehended within the meaning and range of equivalence of the following claims.

What is claimed as new and desired to be protected by Letters Patent is set forth in the appended claims.

1. A compression spring assembly, comprising, in combination, an annular member of elastomeric material having a convexly curved inner surface including a portion defining a minimum diameter of said member in unstressed condition thereof, a convexly curved outer surface whose curvature in the unstressed condition of said annular member is different from the curvature of said inner surface, said outer surface including a portion defining a maximum diameter of said annular member, and a pair of axial end faces; and a pair of compression members disposed at said axial end faces of said annular member, at least one of said compression members being movable toward the other and each having an engagement face facing said annular member and extending transversely of the axis thereof outwardly beyond said outer surface, said compression members engaging said axial end faces of said annular member along respective annular areas whose diameter is greater than said minimum diameter of said annular member in the unstressed condition thereof, but smaller than said minimum diameter plus half the distance between said portions of said inner and outer surfaces whereby, in response to axial compression of said annular member resulting from movement of said compression members one toward the other, the maximum diameter of said annular areas increases.

2. An assembly as defined in claim 1, wherein said engagement faces of said compression members extend in planes normal to said axis of said annular member.

3. An assembly as defined in claim 1, wherein said elastomeric material is a synthetic plastic material.

4. An assembly as defined in claim 1, wherein said elastomeric material is rubber.

5. An assembly as defined in claim 1, wherein said outer surface is convex.

6. An assembly as defined in claim 1, wherein said portion defining the maximum diameter of said annular member coincides substantially with a plane extending normal to said axis midway between said opposite axial ends.

7. An assembly as defined in claim 1, wherein the radial distance between said portions of said inner and outer surfaces is smaller than the distance between said axial ends of said annular member.

8. An assembly as defined in claim 1, wherein the convex curvature of said outer surface exceeds that of said inner surface.

9. An assembly as defined in claim 1, wherein each of said surfaces of said compression members is provided with an annular shoulder overlying a portion of said inner surface of said annular member.

10. An assembly as defined in claim 1; and further comprising at least one additional annular member similar to the first-mentioned annular member, and at least one additional compression member similar to said pair of compression members, said additional annular member being disposed between said additional compression member and one compression member of said pair of compression members and being engaged by respective engagement faces provided on said one and said additional compression members.

11. An assembly as defined in claim 10, wherein said annular members are of identical dimensions.

12. An assembly as defined in claim 1; wherein said engagement faces of said compression members have outermost circumferential edge portions; and further comprising at least one additional annular member similar to said first mentioned annular member and concentrically surrounding the same with spacing from said outer surface thereof and from said outermost circumferential edge portions of said engagement faces, said additional annular member similarly being engaged along respective annular areas by said engagement faces so that, in response to axial compression of both of said axial members resulting for movement of said compression members one toward the other, the maximum diameter of the annular areas on both of said annular members increases.

References Cited

UNITED STATES PATENTS

| 1,936,389 | 11/1933 | Hallquist | 267—4 XR |
| 2,382,372 | 8/1945 | Wallerstein, Jr. | 248—358 |
| 2,575,858 | 11/1951 | Bennett | 267—1(R) XR |
| 2,674,449 | 4/1954 | Tucker | 267—3 |

FOREIGN PATENTS

| 369,321 | 5/1963 | Switzerland. |
| 413,327 | 5/1925 | Germany. |
| 891,238 | 3/1962 | Great Britain. |
| 1,093,873 | 11/1954 | France. |
| 530,630 | 12/1940 | Great Britain. |

DRAYTON E. HOFFMAN, Primary Examiner

HOWARD BELTRAN, Assistant Examiner

U.S. Cl. X.R.

248—358; 267—3, 63